US011608127B1

(12) United States Patent
Vega et al.

(10) Patent No.: US 11,608,127 B1
(45) Date of Patent: Mar. 21, 2023

(54) TRAILER ELECTRICAL CONNECTOR ASSEMBLY

(71) Applicant: Mod.al Group, Inc., American Fork, UT (US)

(72) Inventors: Erick Vega, Salt Lake City, UT (US); Kreg Peeler, Draper, UT (US); Angela Brimhall, Taylorsville, UT (US); Jeremy Carter, Orem, UT (US)

(73) Assignee: Mod.al Group, Inc., American Fork, UT (US)

( * ) Notice: Subject to any disclaimer, the term of this patent is extended or adjusted under 35 U.S.C. 154(b) by 0 days.

(21) Appl. No.: 17/731,377

(22) Filed: Apr. 28, 2022

(51) Int. Cl.
*B62D 53/12* (2006.01)
*B60D 1/64* (2006.01)
*B60D 1/48* (2006.01)

(52) U.S. Cl.
CPC .......... *B62D 53/125* (2013.01); *B60D 1/485* (2013.01); *B60D 1/64* (2013.01)

(58) Field of Classification Search
CPC ...... B62D 53/04; B62D 53/125; B60D 1/485; B60D 1/58; B60D 1/62; B60D 1/64
See application file for complete search history.

(56) References Cited

U.S. PATENT DOCUMENTS

| | | | | |
|---|---|---|---|---|
| 2,143,322 A * | 1/1939 | Knobel, Jr. | ............ | B60D 1/065 439/8 |
| 2,202,753 A * | 5/1940 | Bugatti | ................. | B60D 1/065 236/44 C |
| 3,328,741 A * | 6/1967 | Brown | ..................... | B60D 1/62 439/708 |
| 3,428,334 A * | 2/1969 | Hils | ......................... | B60D 1/62 280/421 |
| 3,797,862 A * | 3/1974 | Letterman | .............. | H01R 39/64 280/901 |
| 3,858,907 A * | 1/1975 | Van Raden | ............ | B60D 1/065 439/26 |
| 4,283,072 A * | 8/1981 | Deloach, Jr. | ............. | B60D 1/06 280/422 |
| 4,319,766 A * | 3/1982 | Corteg | ................... | B60D 1/248 280/446.1 |
| 4,421,340 A * | 12/1983 | Kramer | .................. | B62D 53/06 172/275 |
| 4,568,099 A * | 2/1986 | Celentino | .............. | B60D 1/065 172/275 |
| 4,978,306 A * | 12/1990 | Robb | ..................... | H01R 35/04 439/8 |

(Continued)

*Primary Examiner* — Jacob B Meyer
*Assistant Examiner* — Maurice L Williams
(74) *Attorney, Agent, or Firm* — Kirton McConkie; Brian Tucker

(57) ABSTRACT

Trailer electrical connector assemblies can facilitate the automatic coupling and decoupling of a trailer. A trailer electrical connector assembly can include a vehicle portion and a trailer portion. The vehicle portion can include a hitch ring that is secured to a hitch ball and guides within which contacts are positioned. The trailer portion can include a sleeve that is positioned around a coupling mechanism of the trailer and a sleeve ring that forms receivers within which contacts are positioned. When the hitch ball is inserted into the trailer's coupling mechanism, the receivers can be automatically coupled with the guides to thereby form an electrical connection between the vehicle and the trailer.

20 Claims, 14 Drawing Sheets

(56) References Cited

U.S. PATENT DOCUMENTS

| | | | | |
|---|---|---|---|---|
| 5,009,443 | A * | 4/1991 | Howatt | A01B 59/008 |
| | | | | 172/272 |
| 6,980,096 | B1 * | 12/2005 | Washington, III | B60D 1/60 |
| | | | | 340/687 |
| 7,291,017 | B1 * | 11/2007 | Fain | B60D 1/64 |
| | | | | 439/35 |
| 7,581,746 | B2 * | 9/2009 | Abate | B62D 53/125 |
| | | | | 403/321 |
| 8,308,181 | B2 * | 11/2012 | Riibe | B60D 1/64 |
| | | | | 280/422 |
| 8,322,899 | B1 * | 12/2012 | Rosario | B60Q 7/02 |
| | | | | 362/540 |
| 9,893,453 | B2 * | 2/2018 | Cox | H01R 24/62 |
| 10,059,160 | B2 * | 8/2018 | Ruiz | B60D 1/065 |
| 11,063,389 | B2 * | 7/2021 | Lee | G09G 5/006 |
| 2004/0038557 | A1 * | 2/2004 | Mattern | H01R 13/6315 |
| | | | | 439/35 |
| 2016/0144906 | A1 * | 5/2016 | Han | B60D 1/62 |
| | | | | 180/14.2 |
| 2018/0022176 | A1 * | 1/2018 | Cardenas | B60D 1/64 |
| | | | | 280/422 |
| 2018/0244117 | A1 * | 8/2018 | Troutman | H01R 13/5213 |
| 2019/0293505 | A1 * | 9/2019 | Briitt | G01L 5/136 |
| 2020/0189335 | A1 * | 6/2020 | Harmon | B60L 53/18 |
| 2020/0244005 | A1 * | 7/2020 | Yonnet | H01F 7/021 |
| 2021/0053407 | A1 * | 2/2021 | Smith | B25J 9/1697 |
| 2021/0101429 | A1 * | 4/2021 | Peterson | H01R 13/52 |
| 2021/0206217 | A1 * | 7/2021 | Angermann | B60D 1/62 |
| 2021/0347218 | A1 * | 11/2021 | Huett | H01R 31/065 |

* cited by examiner

TRAILER ELECTRICAL CONNECTOR ASSEMBLY

CROSS-REFERENCE TO RELATED APPLICATIONS

N/A

BACKGROUND

A trailer coupler is the front portion of a trailer by which the trailer is coupled to a vehicle for towing. Typically, a trailer coupler includes a downward-facing opening that is lowered overtop an upwardly oriented trailer ball. Once the trailer ball is positioned within the trailer coupler, the user must typically manually activate a latch to thereby secure the trailer coupler to the trailer ball. Additionally, the user must typically insert the trailer's electrical connector (or plug) into the vehicle's electrical connector (or socket), which are most commonly 7-way connectors, to thereby provide power for the trailer's lights and possibly brakes. Accordingly, the typical process for hitching a trailer to a vehicle is manual and tedious.

BRIEF SUMMARY

The present invention is directed to trailer electrical connector assemblies that facilitate the automatic coupling and decoupling of a trailer. A trailer electrical connector assembly can include a vehicle portion and a trailer portion. The vehicle portion can include a hitch ring that is secured to a hitch ball and guides within which contacts are positioned. The trailer portion can include a sleeve that is positioned around a coupling mechanism of the trailer and a sleeve ring that forms receivers within which contacts are positioned. When the hitch ball is inserted into the trailer's coupling mechanism, the receivers can be automatically coupled with the guides to thereby form an electrical connection between the vehicle and the trailer.

In some embodiments, the present invention may be implemented as a trailer electrical connector assembly that includes a vehicle portion having a hitch ring in which a first set of connectors are positioned and a trailer portion having a sleeve and a sleeve ring in which a second set of connectors are positioned. The sleeve ring couples with the hitch ring to form an electrical connection between the first set of connectors and the second set of connectors.

In some embodiments, the hitch ring includes guides and the first set of connectors are positioned in the guides.

In some embodiments, each guide comprises a recessed surface in which at least one connector of the first set of connectors is positioned.

In some embodiments, the recessed surface is formed between inner walls of the guide.

In some embodiments, the sleeve ring includes receivers in which the second set of connectors are positioned. Each receiver may insert between the inner walls of a respective guide.

In some embodiments, the sleeve ring includes sleeve guides that interface with outer walls of the guides to align the receivers with the guides.

In some embodiments, the hitch ring and the sleeve ring include magnets for coupling the sleeve ring with the hitch ring.

In some embodiments, the vehicle portion includes a cover that is secured to the hitch ring.

In some embodiments, the guides are spaced around an opening through which a hitch ball extends when the vehicle portion is secured to the hitch ball.

In some embodiments, the hitch ball is rearwardly oriented and the sleeve extends frontwardly over the hitch ball when the receivers are coupled with the guides.

In some embodiments, the sleeve is flexible.

In some embodiments, the sleeve forms wire openings through which wires enter an interior of the sleeve.

In some embodiments, the trailer portion includes a clamping assembly by which the sleeve is secured to a trailer.

In some embodiments, the present invention is implemented as a trailer electrical connector assembly that includes a vehicle portion and a trailer portion. The vehicle portion includes a hitch ring that is configured to be secured around a hitch ball and guides that extend from the hitch ring. Each guide houses at least one connector. The trailer portion includes a sleeve that is configured to be secured to a trailer around a trailer coupler mechanism and a sleeve ring that includes receivers. Each receiver houses at least one connector. The receivers couple with the guides to form an electrical connection via the respective connectors.

In some embodiments, the receivers couple with the guides by inserting into the guides.

In some embodiments, the receivers couple with the guides when the hitch ball is inserted through the sleeve ring.

In some embodiments, the vehicle portion and the trailer portion include magnets by which the receivers remain coupled with the guides.

In some embodiments, the present invention is implemented as a trailer coupler assembly that includes a main body forming a frontward-facing opening for receiving a rearwardly oriented hitch ball, a vehicle portion configured to be secured around the rearwardly oriented hitch ball, the vehicle component including guides, and a trailer portion having a sleeve that extends frontwardly over the frontward-facing opening and a sleeve ring positioned at a front of the sleeve, the sleeve ring including receivers that couple with the guides to form an electrical connection.

In some embodiments, the vehicle portion and the trailer portion include magnets for causing the receivers to remain coupled with the guides.

In some embodiments, the receivers insert into the guides to form the electrical connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention encompass trailer electrical connector assemblies that facilitate the automatic coupling and decoupling of a trailer. A trailer electrical connector assembly can form an electrical connection in conjunction with a hitch ball being automatically coupled to a trailer coupler assembly. The trailer electrical connector assembly can also decouple to cease forming the electrical connection in conjunction with the hitch ball being automatically decoupled from the trailer coupler assembly.

Figure 1A:
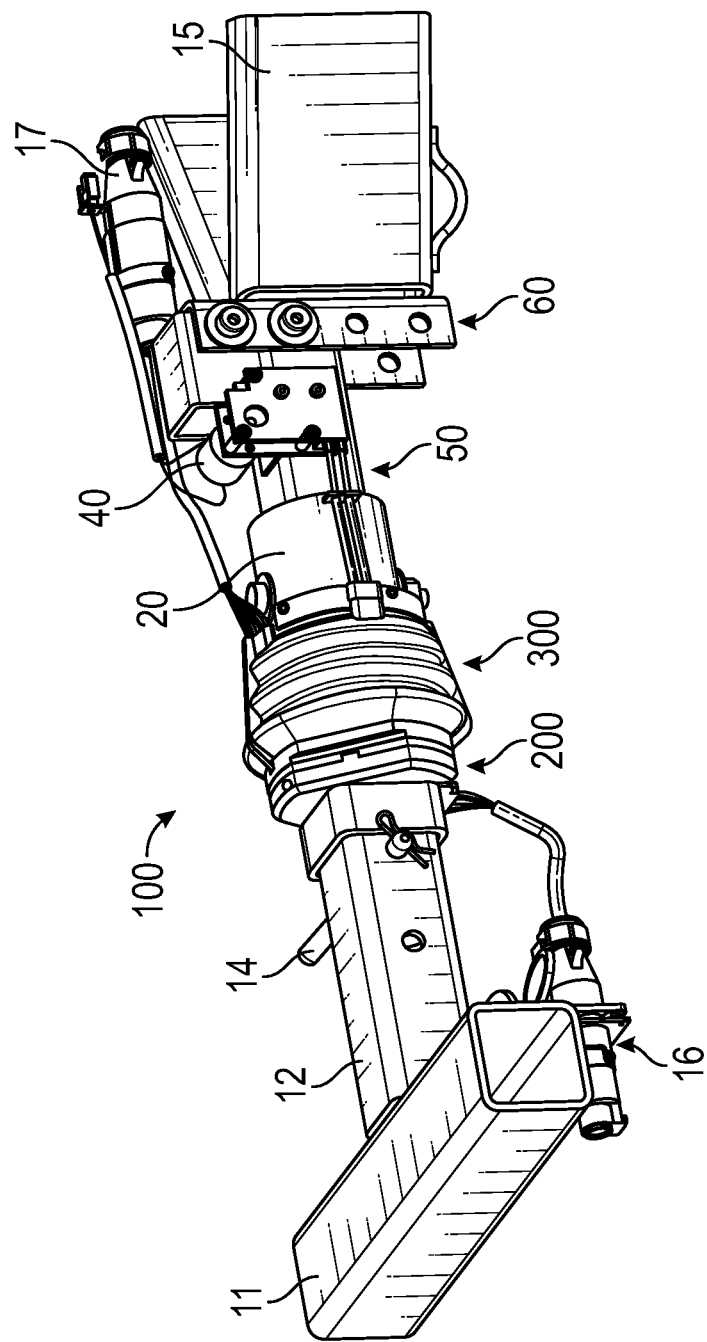
FIG. 1A is a perspective side view of a trailer electrical connector assembly configured in accordance with one or more embodiments of the present invention when a trailer is coupled to a vehicle.
Figure 1B:
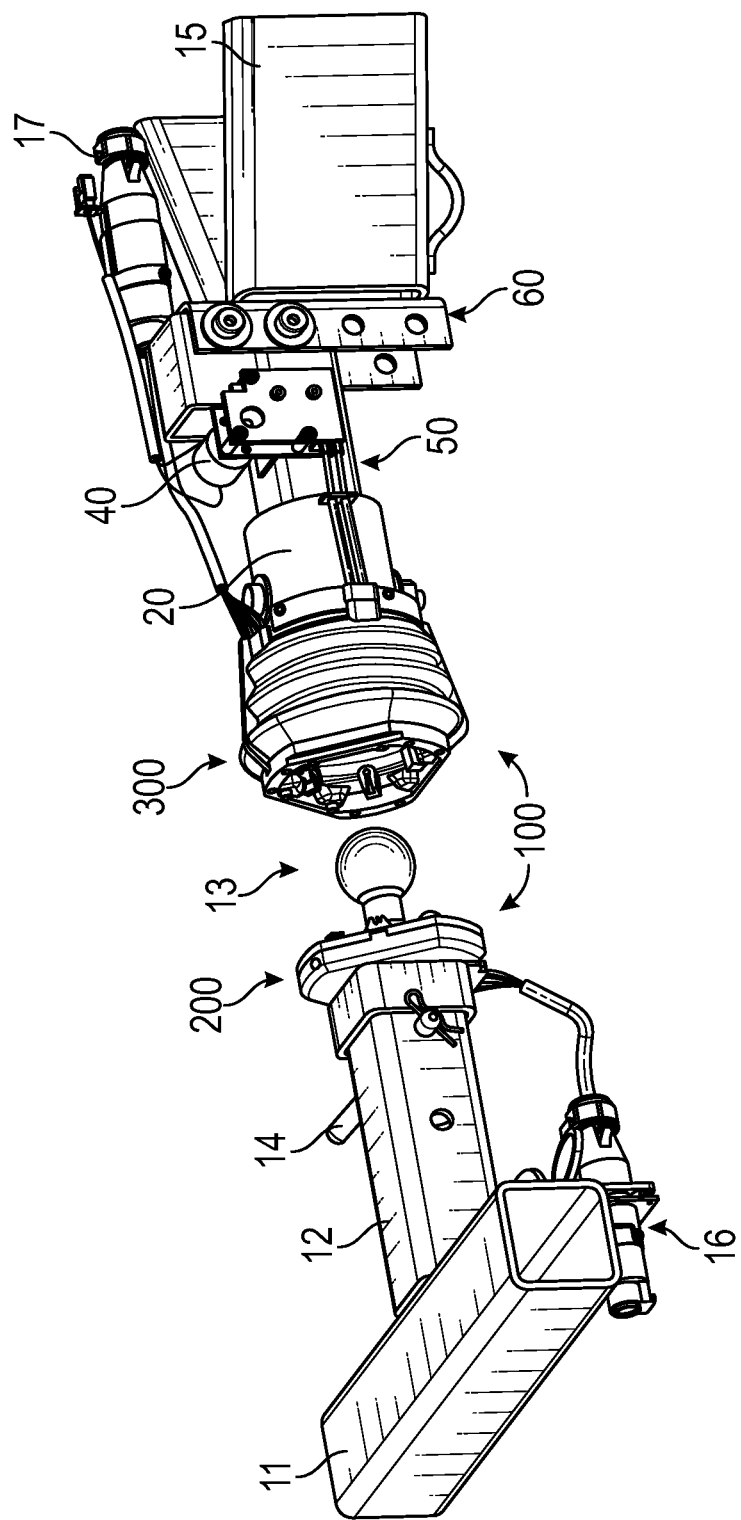
FIG. 1B is a perspective side view of a trailer electrical connector assembly configured in accordance with one or more embodiments of the present invention when a trailer is not coupled to a vehicle.

FIGS. 1A and 1B are side perspective views of a trailer electrical connector assembly 100 (hereinafter connector assembly 100) that is configured in accordance with one or more embodiments of the present invention. Connector assembly 100 may include a vehicle portion 200, which is the portion that is coupled to the vehicle, and a trailer portion 300, which is the portion that is coupled to the trailer. In FIG. 1A, the trailer is coupled to the vehicle and therefore vehicle portion 200 and trailer portion 300 are coupled together. In FIG. 1B, the trailer is not coupled to the vehicle and therefore vehicle portion 200 and trailer portion 300 are not coupled together. Accordingly, vehicle portion 200 and trailer portion 300 can be configured to automatically couple and decouple as a trailer is coupled to and decoupled from a vehicle.

Connector assembly 100 will be described in the context of a trailer coupler assembly that is the subject of co-pending U.S. application Ser. No. 17/729,862 (the '862 Application), which is incorporated herein by reference. As an overview, embodiments of the trailer coupler assembly described in the '862 Application may be mounted to, integrated with, or otherwise secured to a frame 15 of a trailer in any suitable manner. In the example shown in FIGS. 1A and 1B, the trailer coupler assembly includes a shaft 50 to which a main body 20 is secured and a bracket 60 that is coupled to frame 15 and enables the height of shaft 50 relative to the trailer to be adjusted. Main body 20 can form a frontward-facing opening (not visible in FIGS. 1A and 1B) into which a rearwardly oriented hitch ball 13 can insert to secure the trailer to a vehicle. Hitch ball 13 can be secured (e.g., via pin 14) within a receiver tube 12 that extends from a receiver hitch 11. Receiver hitch 11 may typically be a rear receiver hitch but could also be a front receiver hitch or any other hitch capable of supporting a trailer ball in the depicted orientation. The trailer coupler assembly may include a release assembly 40 for allowing hitch ball 13 to be decoupled from main body 20. In the depicted embodiment, the vehicle and trailer include sockets 16 and 17 for establishing an electrical connection. Although they are depicted as 7-way connectors, sockets 16 and 17 can represent any electrical connector that may be used on a vehicle or trailer including the various connectors that are commonly used (e.g., 4-way, 5-way, 6-way, etc.) and any custom or specialized connectors.

Embodiments of the present invention should not be limited to use with the trailer coupler assembly of the '862 Application. To the contrary, a trailer electrical connector assembly configured in accordance with embodiments of the present invention could be used in conjunction with a variety of hitches, ball mounts, trailer couplers, etc. For example, connector assembly 100 could be adapted for use with a traditional rear receiver hitch in which the hitch ball is oriented upwardly or for use with a gooseneck hitch.

Figure 2A:
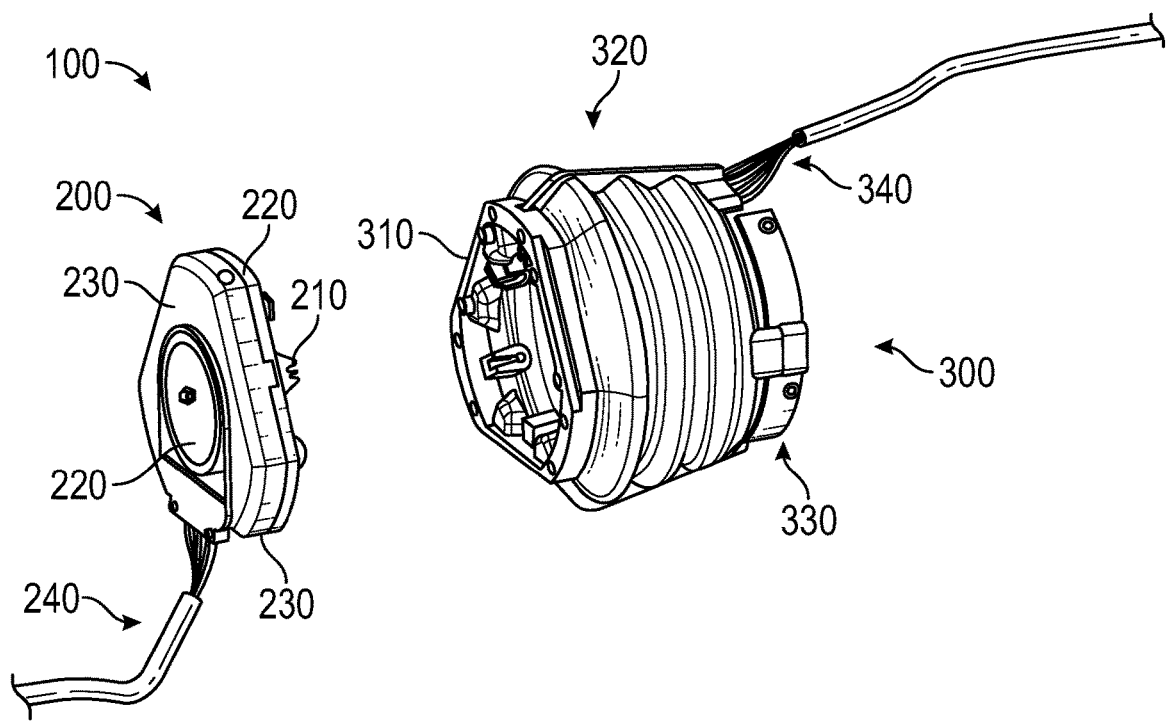
FIGS. 2A and 2B are side perspective views of a trailer electrical connector assembly configured in accordance with one or more embodiments of the present invention.
Figure 2B:
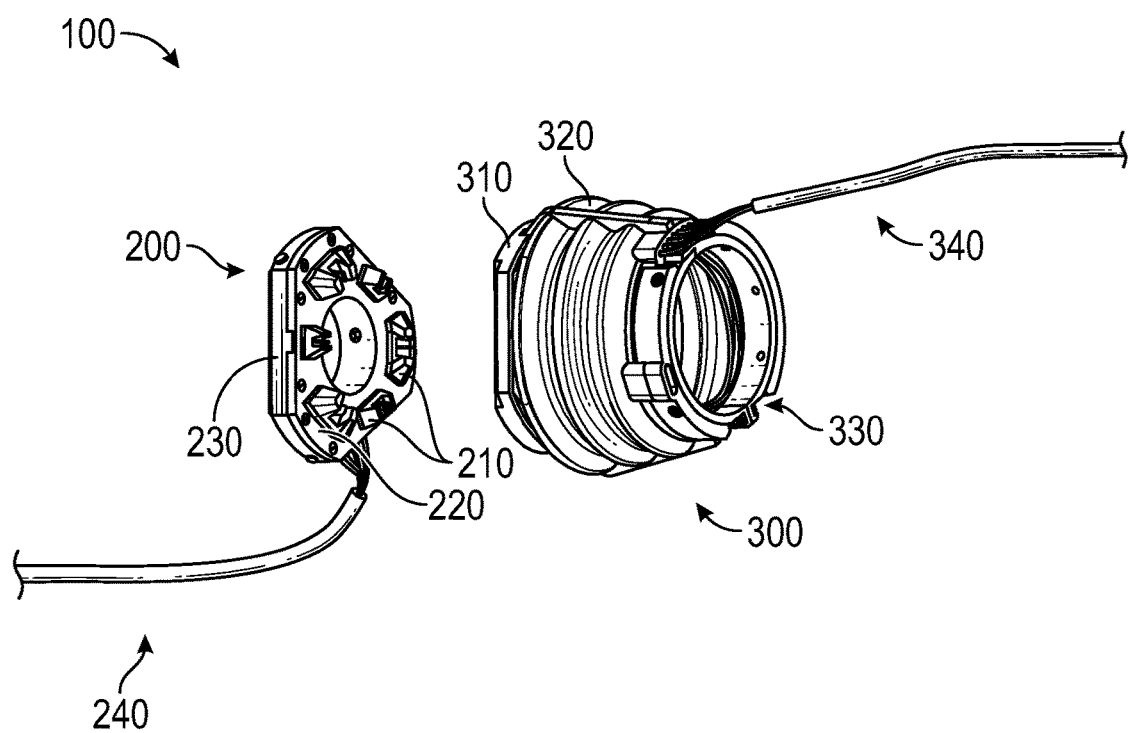

FIGS. 2A and 2B are views of connector assembly 100 in isolation with vehicle portion 200 separated from trailer portion 300. Vehicle portion 200 includes a number of guides 210 that are secured to or integrated with a hitch ring 220. In the depicted embodiment, there are six guides 210 but fewer or more could be used. Hitch ring 220 is configured to be secured to a hitch ball such as hitch ball 13. For example, hitch ring 220 can form an opening 221 (see FIG. 3A) that is shaped and sized to fit around the shaft of hitch ball 13. A cover 230 can be positioned overtop hitch ring 220 opposite guides 210. Vehicle portion 200 may also include or be configured to receive a wire harness 240 by which vehicle portion 200 is electrically connected to the vehicle's electrical system (e.g., via socket 16).

Trailer portion 300 includes a sleeve ring 310 that is configured to mate with hitch ring 220 to form an electrical connection between a vehicle and a trailer, a sleeve 320 that is coupled to and extends from sleeve ring 310, a clamp assembly 330 by which sleeve 320 is secured to main body 20 or another portion of a trailer coupler assembly, and a wire harness 340 by which trailer portion 300 is electrically connected to the trailer's electrical system (e.g., via socket 17). Sleeve 320 can be formed of a flexible material and may have folds (e.g., like an accordion) to enable sleeve 320 to pivot and stretch during towing of a trailer to thereby maintain a connection between hitch ring 220 and sleeve ring 310.

Figure 3A:
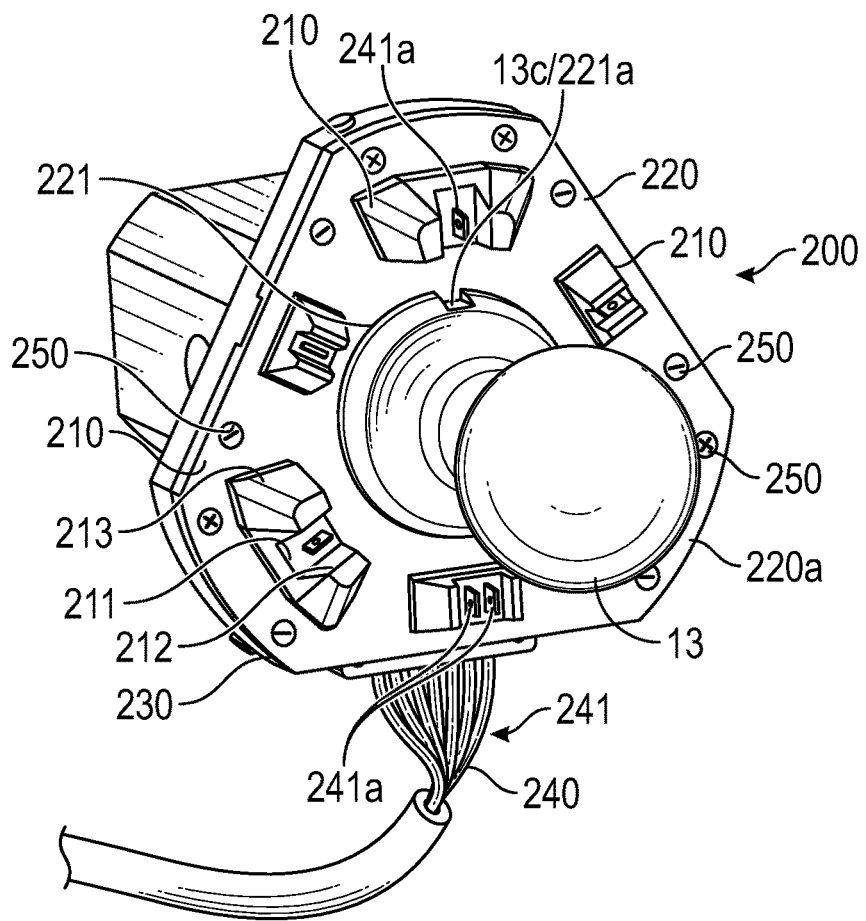
FIGS. 3A and 3B are perspective views of a vehicle portion of a trailer electrical connector assembly configured in accordance with one or more embodiments of the present invention when the vehicle portion is secured to a rearwardly oriented hitch ball.
Figure 3B:
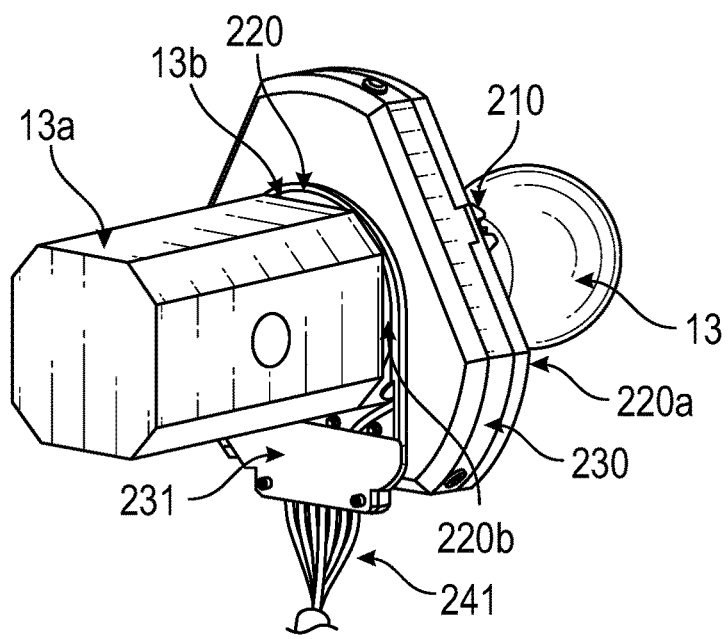
Figure 3C:
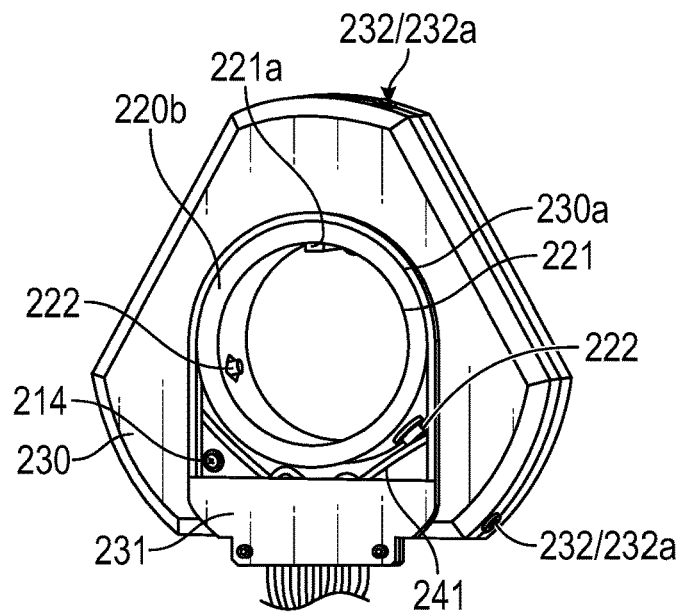
FIG. 3C is an isolated view of a trailer electrical connector assembly configured in accordance with one or more embodiments of the present invention.
Figure 3D:
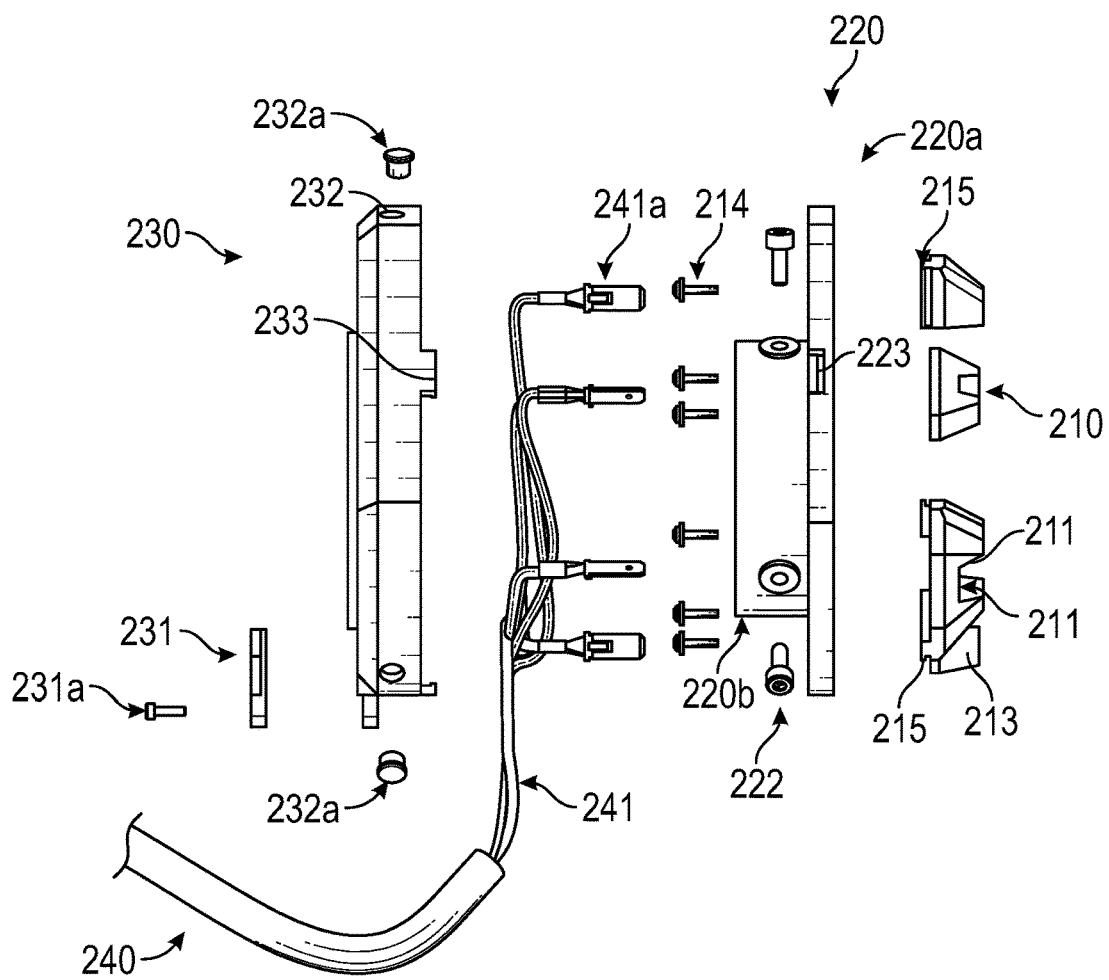
FIGS. 3D and 3E are exploded views of a trailer electrical connector assembly configured in accordance with one or more embodiments of the present invention.
Figure 3E:
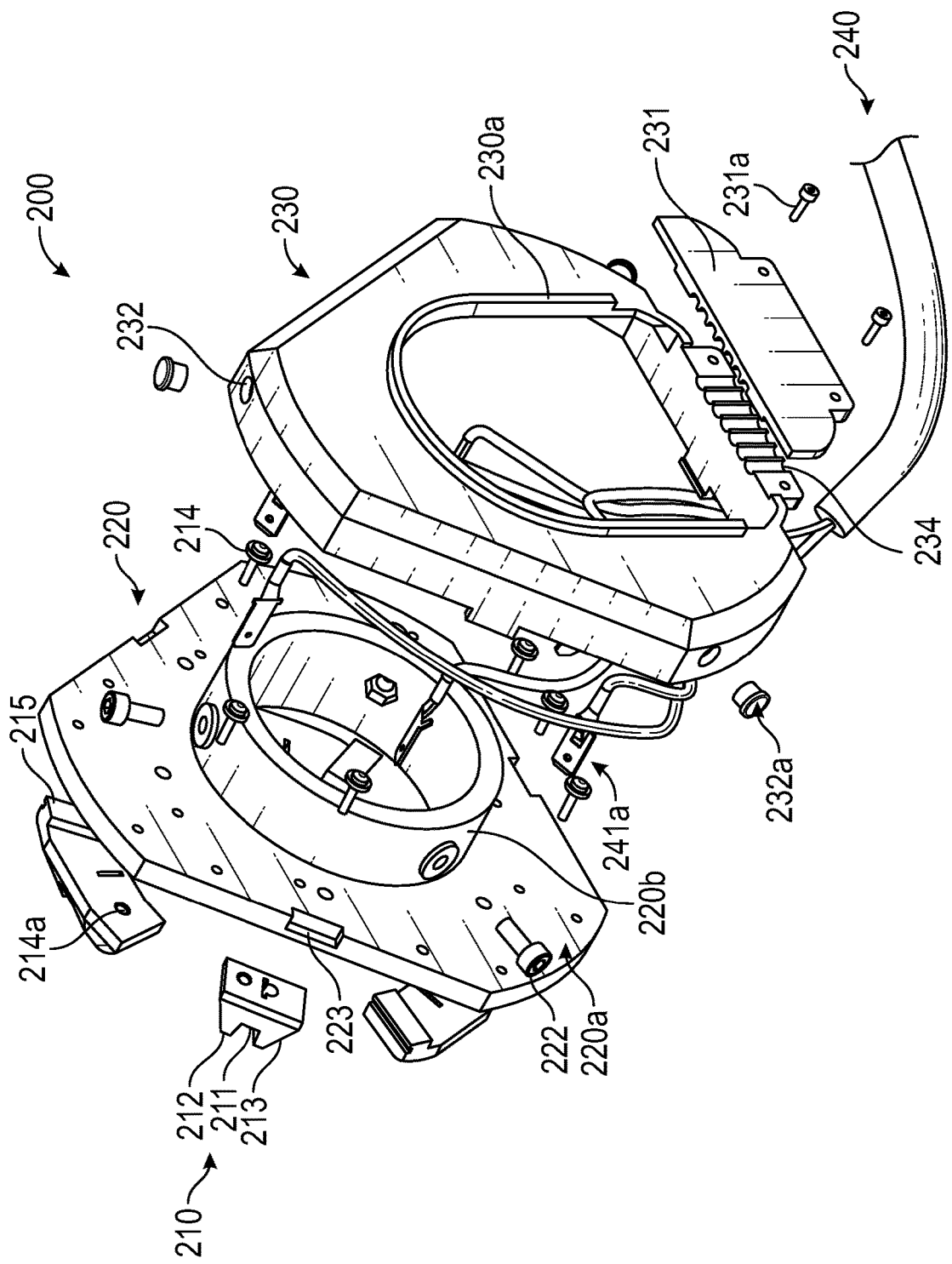
Figure 3F:
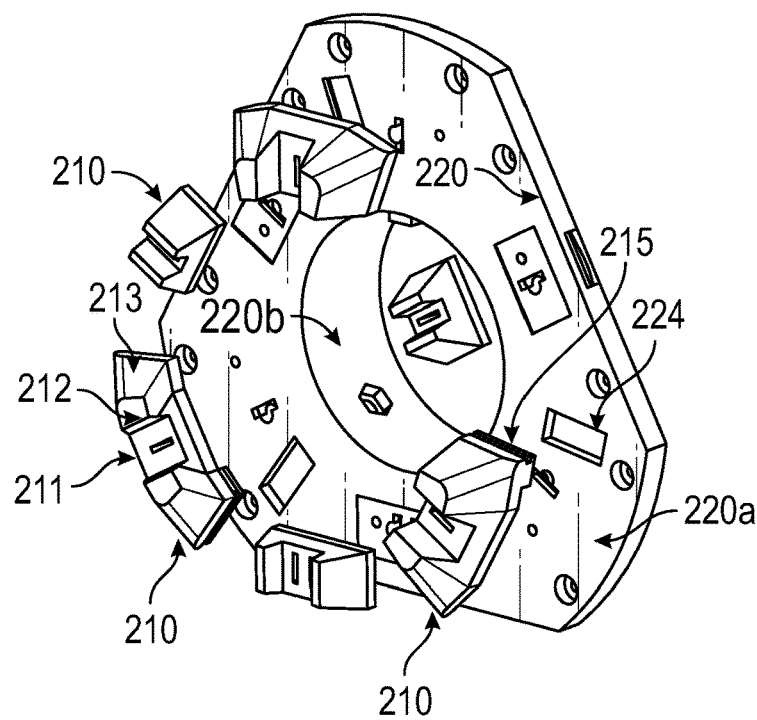
FIG. 3F is an isolated view of a hitch ring and guides of a vehicle portion of a trailer electrical connector assembly configured in accordance with one or more embodiments of the present invention.
Figure 3G:
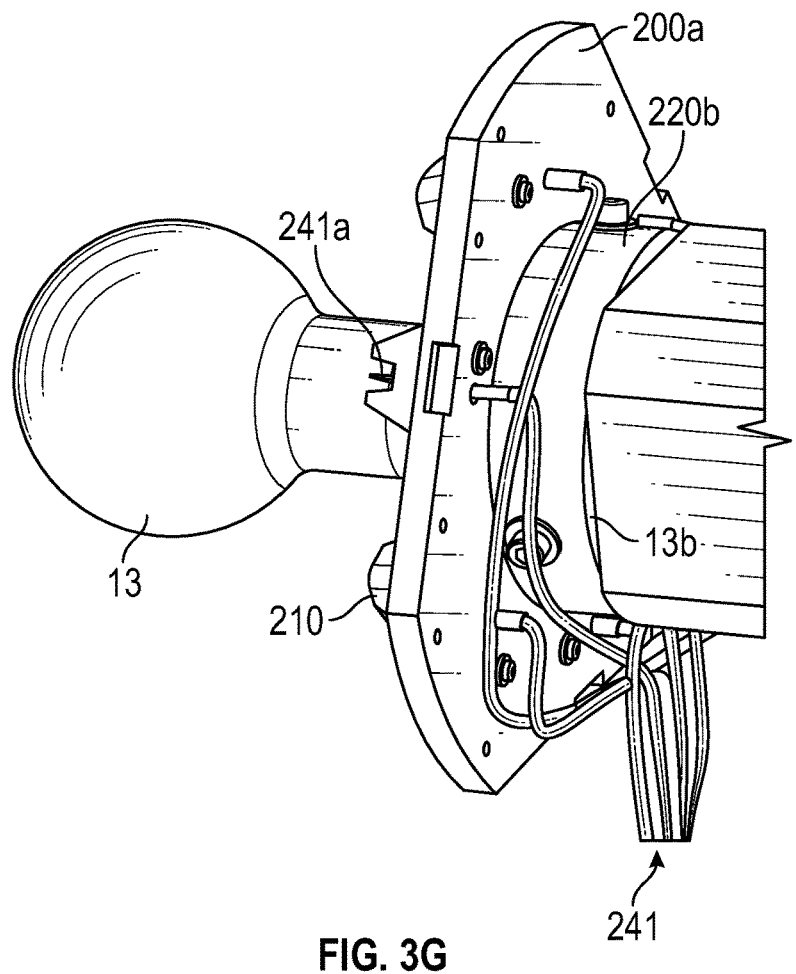
FIG. 3G is a view of a hitch ring and guides of a vehicle portion of a trailer electrical connector assembly configured in accordance with one or more embodiments of the present invention when the hitch ring is secured to a rearwardly oriented hitch ball.

FIGS. 3A-3G are different views of vehicle portion 200. FIGS. 3A and 3B are perspective views of vehicle portion 200 when secured to hitch ball 13. FIG. 3C is a perspective view of vehicle portion 200 in isolation. FIGS. 3D and 3E are exploded side and perspective views of vehicle portion 200. FIG. 3F shows guides 210 and hitch ring 220 in isolation with guides 210 separated from hitch ring 220. FIG. 3G shows hitch ring 220 when secured to hitch ball 13 and with cover 230 removed.

Hitch ring 220 may have an outer portion 220a and an inner portion 220b that form an opening 221 that may be round to match the shaft of hitch ball 13. To ensure proper orientation of hitch ring 220 on hitch ball 13, a tooth 221a may be formed in opening 221 and may insert into a channel 13c formed in hitch ball 13. In some embodiments, hitch ring 220 can be configured so that inner portion 220b abuts the face 13b of the shank 13a of hitch ball 13. Set screws 222 may be used in inner portion 220b to secure hitch ring 220 to the shaft of hitch ball 13. Cover 230 may include openings 232 that align with set screws 222 to provide access to set screws 222 without removing cover 230. Plugs 232a can be inserted into openings 232 to prevent water from entering into hitch ring 220. Outer portion 220a of hitch ring 220 may include recesses 223 on its edges into which tabs 233 on cover 230 insert to secure cover 230 to hitch ring 220. Cover 230 forms an opening 230a that generally aligns with opening 221 and may include a cap 231 that is configured to receive and secure wires 241 as they pass into hitch ring 220. In some embodiments, cap 231 can be removed to assemble wires 241 into wire channels 234 and then secured via screws 231a.

Guides 210 extend from a face of outer portion 220a and may be spaced around opening 221. Guides 210 can be secured to hitch ring 220 in any suitable manner such as via screws 214 and holes 214a and/or tabs 215 and recesses 224. In the depicted embodiment, there are six guides 210, five of which house a single contact 241a of wires 241 and one of which houses two contacts 241a of wires 241. However, other numbers and arrangements of guides 210 could be used such as when the vehicle and trailer have different electrical connections (e.g., fewer guides 210 for a 4-way connection). Each guide 210 forms a recessed surface 211 between inner walls 212. Contacts(s) 241a can extend out from recessed surface 211. Inner walls 212 may be sloped away from each other to create a wider opening to recessed surface 211. In contrast, outer walls 213 may be sloped towards one another (e.g., to form a generally conical shape). As described in detail below, the sloping of inner walls 212 and outer walls 213 facilitates the coupling of hitch ring 220 to sleeve ring 310. Magnets 250 can be integrated into hitch ring 220. For example, magnets 250 could be spaced around the edge of hitch ring 220.

Figure 4A:
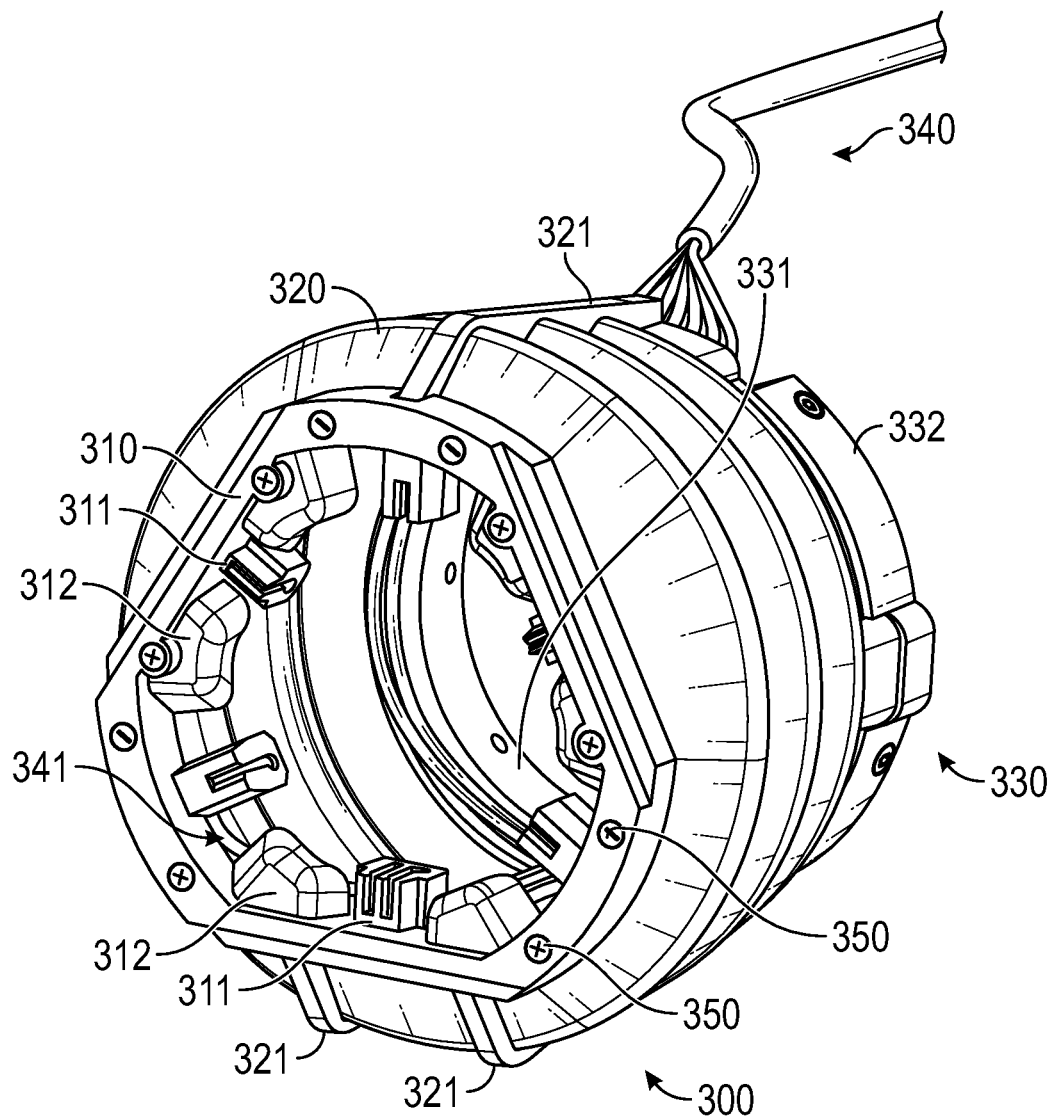
FIGS. 4A-4D are perspective, front, side, and exploded views respectively of a trailer portion of a trailer electrical connector assembly configured in accordance with one or more embodiments of the present invention.
Figure 4B:
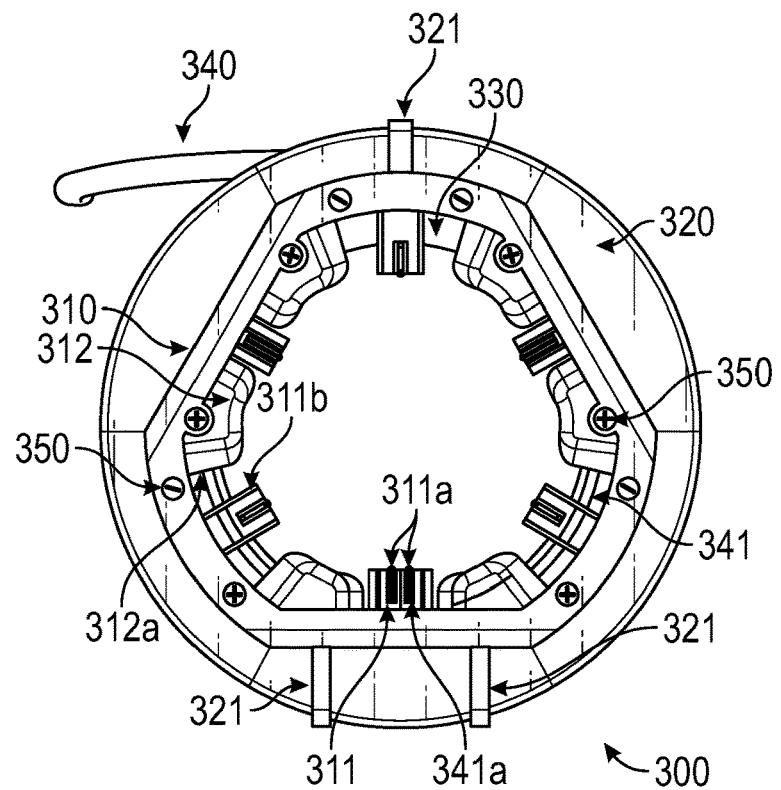
Figure 4C:
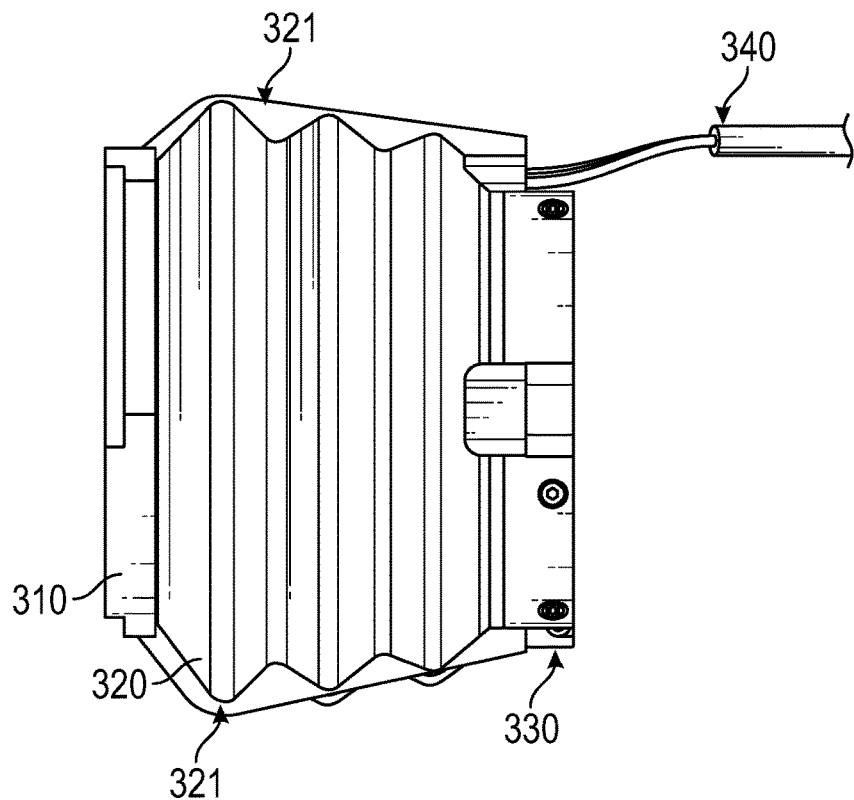
Figure 4D:
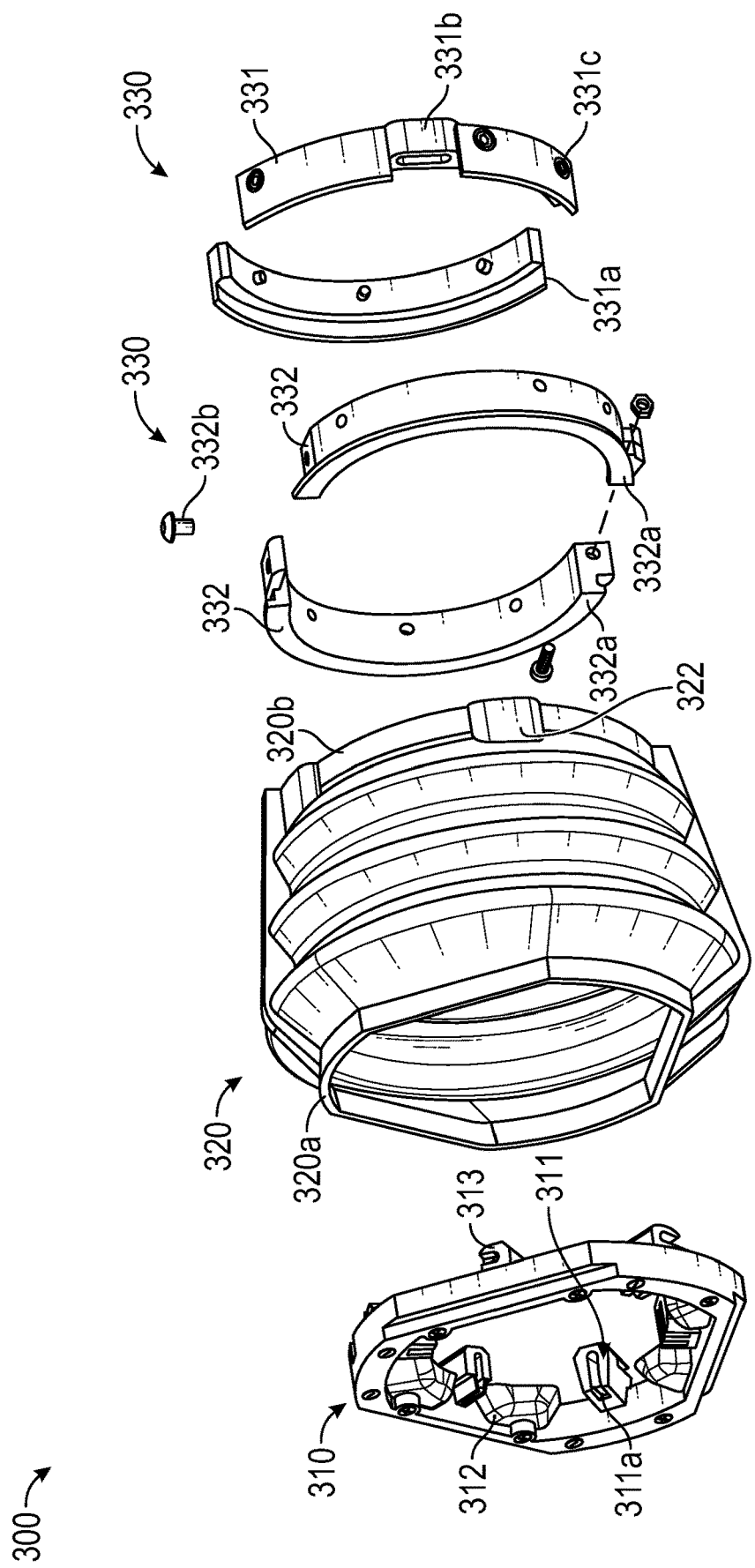
Figure 4E:
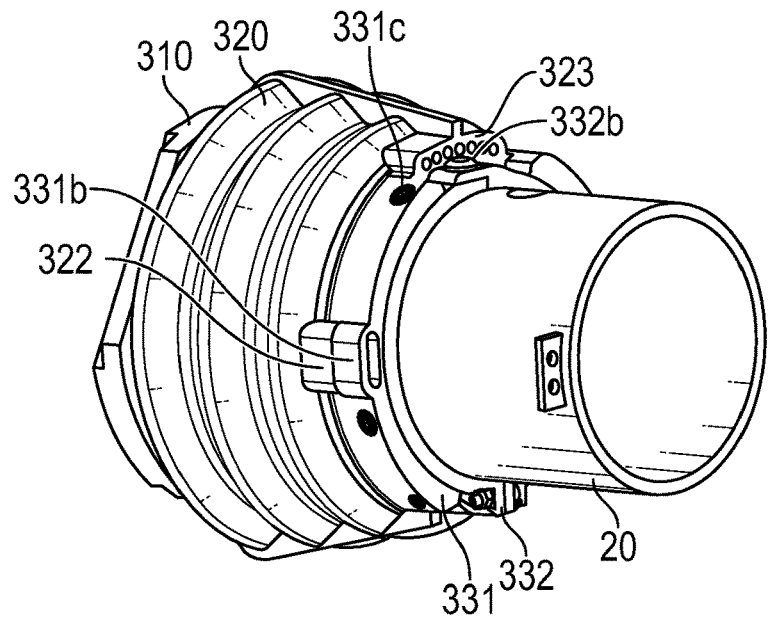
FIGS. 4E and 4F are views of a trailer portion of a trailer electrical connector assembly configured in accordance with one or more embodiments of the present invention when the trailer portion is secured to a main body of a trailer coupler assembly.
Figure 4F:
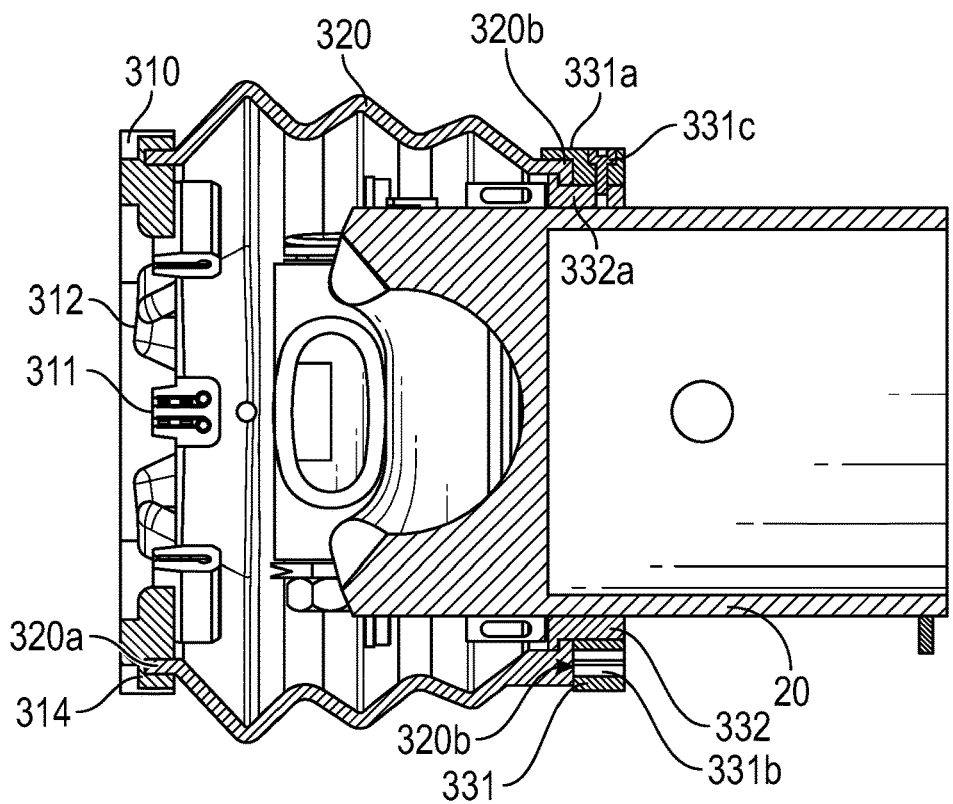

FIGS. 4A-4F provide various views of trailer portion 300. FIGS. 4A-4C are perspective, front and side views respectively of trailer portion 300 in isolation. FIG. 4D is an exploded view of trailer portion 300. FIG. 4E is a perspective view of trailer portion 300 when secured to main body 20. FIG. 4F is a cross-sectional top view of trailer portion 300 when secured to main body 20.

Sleeve ring 310 may have, but need not have, a shape that generally corresponds with the shape of hitch ring 220 and may integrate magnets 350 that align with magnets 250. Accordingly, as hitch ring 220 approaches sleeve ring 310, magnets 250 and 350 can attract one another to couple and retain hitch ring 220 and sleeve ring 310 together.

Sleeve ring 310 may form receivers 311 that are configured to insert between inner walls 212 of guides 210. Each receiver 311 can correspond with one of guides 210 and can form a slot 311a (or slots 311a in the case of the bottom receiver 311) within which a contact 341a of wires 341 is positioned. Accordingly, when receiver 311 is inserted between inner walls 212 towards recessed surface 211, contact(s) 241a and contact(s) 341a will form an electrical connection. In some embodiments, outer walls 311b of receivers 311 can be sloped towards one another to facilitate insertion of receivers 311 between inner walls 212.

In some embodiments, each guide 210 and each receiver 311 need not include a contact 241a or contact 341a respectively. For example, if connector assembly 100 as depicted in the figures were used with a vehicle and trailer that included a 4-way connector, only four contacts 241a and 341a could be used with some of guides 210 and receivers 311 lacking contacts.

Sleeve ring 310 can also form sleeve guides 312 that are positioned between receivers 311. Sleeve guides 312 can be configured so that their outer walls 312a align with outer walls 213 of guides 210. Therefore, as guides 210 approach receivers 311, outer walls 213 and outer walls 312a can contact one another to cause each slot 311a to align with the respective contact 241a. For example, if hitch ring 220 and sleeve ring 310 are not aligned as vehicle portion 200 approaches trailer portion 300, outer walls 213 and outer walls 312a can contact one another and the flexibility of sleeve 320 can allow outer walls 213 and outer walls 312a to steer receivers 311 between inner walls 212 of the respective guides 210. Magnets 250 and 350 can further assist in pulling receivers 311 and guides 210 together.

Sleeve 320 can include folds that allow its length to extend and contract and facilitates side-to-side flexing. One or more ribs 321 may extend along sleeve 320 to assist in maintaining sleeve 320 in a horizontal orientation (e.g., to minimize sagging when not coupled to vehicle portion 200). For example, one rib 321 may be positioned at the top of sleeve 320 and two ribs may be positioned at the bottom of sleeve 320. In some embodiments, sleeve 320 could include flexible steel rods or cables extended therethrough for reinforcement.

In some embodiments, sleeve 320 may include a front lip 320a that inserts into a channel 314 in sleeve ring 310. Front lip 320a can be glued, welded, or otherwise secured within channel 314 to prevent separation of sleeve ring 310 from sleeve 320. Sleeve ring 310 may include wire mounts 313 for retaining wires 341 away from the opening through which hitch ball 13 inserts.

In some embodiments, sleeve 320 may include a rear lip 320b that may be sandwiched between clamp assembly 330 to secure sleeve 320 to main body 20 or to otherwise secure sleeve 320 to the trailer. Clamp assembly 330 may include inner clamp members 332 that can be secured around main body 20 (e.g., via screws 332b) and outer clamp member 331 that can be secured to inner clamp members 332 (e.g., via screws 331c). A flange 332a may be formed on inner clamp members 332 and may be positioned inside sleeve 320 frontward of rear lip 320b. A lip 331a may be formed on outer clamp members 331 and may overlap flange 332a to thereby sandwich rear lip 320b.

As best seen in FIG. 4E, wire openings 323 may be formed in the rear of sleeve 320 to allow wires 341 to be routed into the interior of sleeve 320. Sleeve 320 and outer clamp members 331 may also form release mechanism guides 322 and 331b respectively through which components of a release mechanism may insert into the interior of sleeve 320.

Figure 5A:
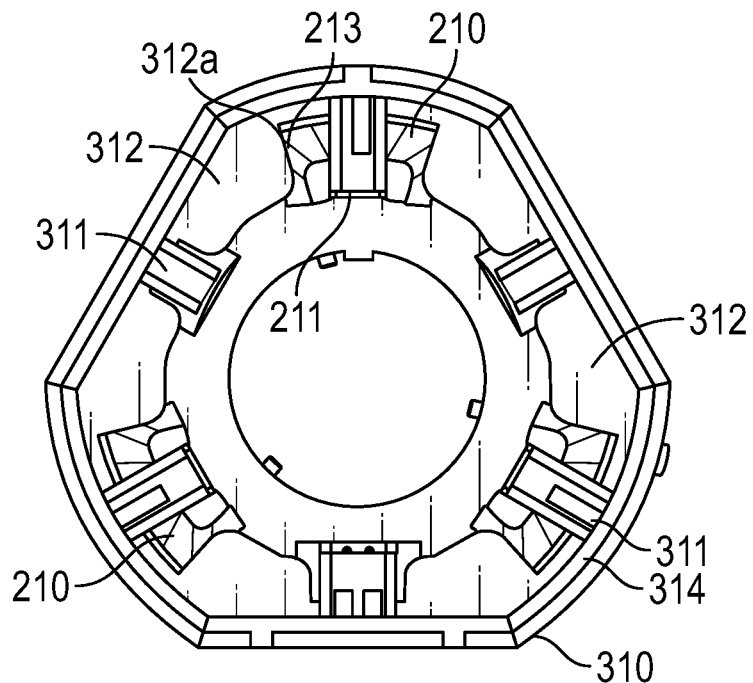
FIGS. 5A and 5B provide examples of how a vehicle portion and a trailer portion can be coupled together to form an electrical connection.
Figure 5B:
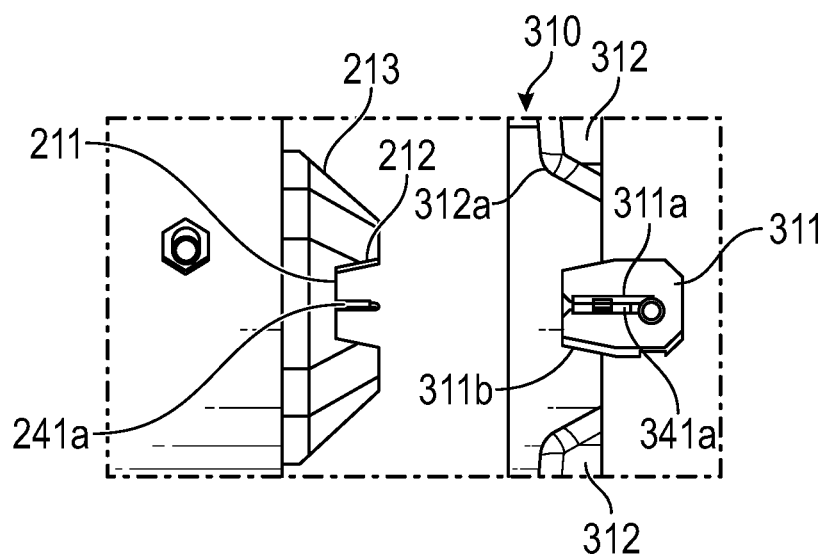

FIGS. 5A and 5B provide more details regarding how an electrical connection is established using connector assembly 100. These figures show sleeve ring 310, hitch ring 220, and guides 210 in isolation. The view in FIG. 5A is from behind sleeve ring 310 while the view in FIG. 5B is from the side. As shown, outer walls 312a extend beyond receivers 311 and overlap with outer walls 213. Accordingly, as outer walls 312a contact outer walls 213, it will force receivers 311 into alignment with recessed surfaces 211. Outer walls 311b and inner walls 212 can also enhance this alignment as contacts 241a are forced into slots 311a to connect with contacts 341a.

Figure 6:
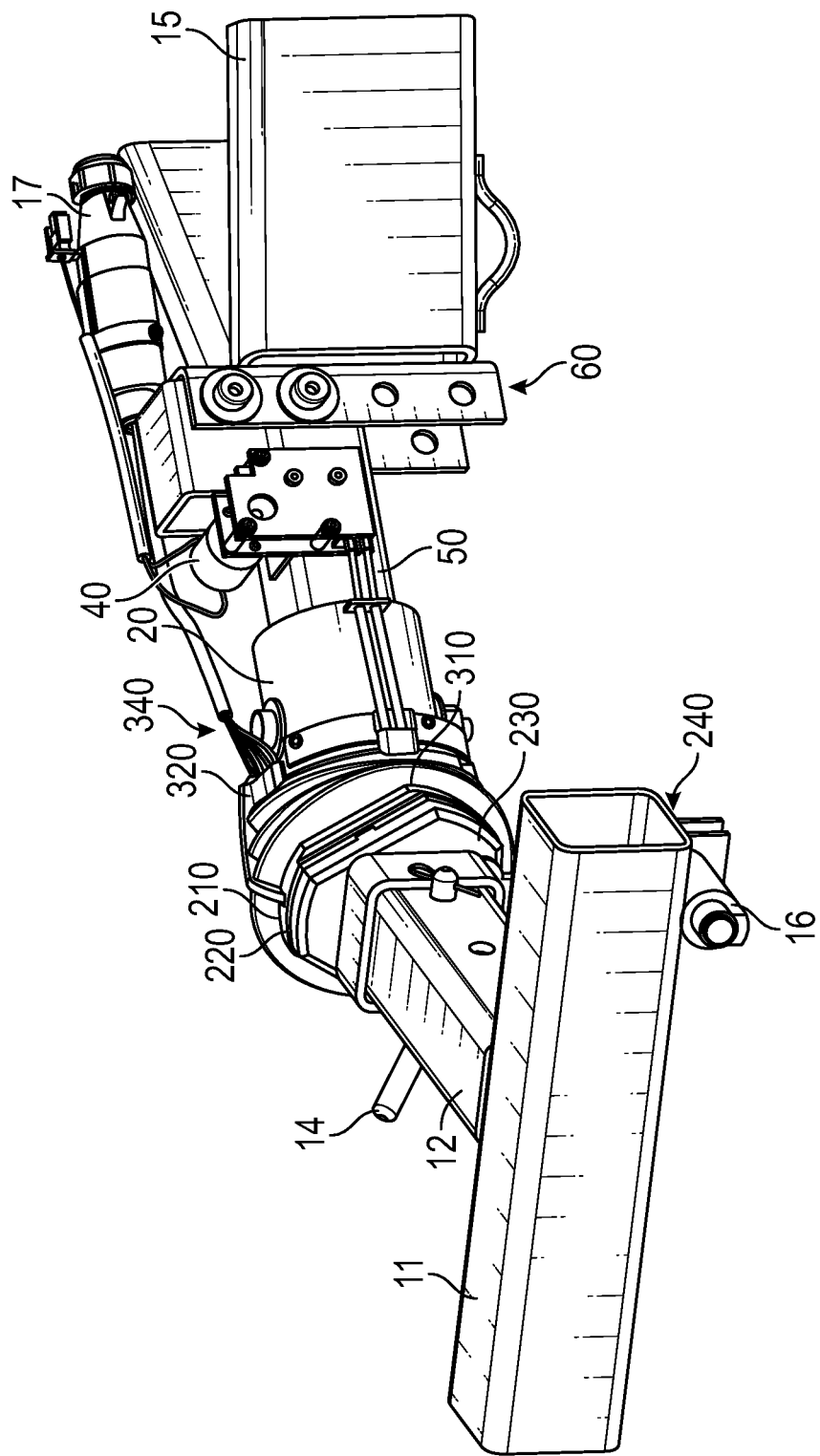
FIG. 6 provides an example of how a trailer portion can remain connected to a vehicle portion when a vehicle is angled relative to a trailer.

FIG. 6 provides an example of how trailer portion 300 remains connected to vehicle portion 200 during towing. In FIG. 6, hitch ball 13 has been coupled to main body 20 such as is described in the '862 Application. In conjunction with the coupling of hitch ball 13 to main body 20, magnets 250 and 350 can pull sleeve ring 310 and hitch ring 220 together causing contacts 241a to be inserted into slots 311a. This would typically occur as the vehicle is backed towards the trailer until hitch ball 13 inserts through sleeve ring 310 and into the trailer's coupling mechanism such as via locking assembly 30 described in the '862 Application.

As the vehicle turns, hitch ball 13 may pivot relative to shaft 50. However, due to the flexibility of sleeve 320 and the magnetic connection, sleeve ring 310 can remain coupled to hitch ring 220 thereby maintaining the electrical connection between the vehicle and the trailer. However, once hitch ball 13 is released from main body 20, such as via release assembly 40 as described in the '862 Application, sleeve ring 310 can simply disconnect from hitch ring 220 as the vehicle drives away from the trailer. As can be seen, connector assembly 100 facilitates the connection and disconnection of a trailer's electrical system to and from a vehicle's electrical system including when the vehicle is autonomous.

Figure 7:
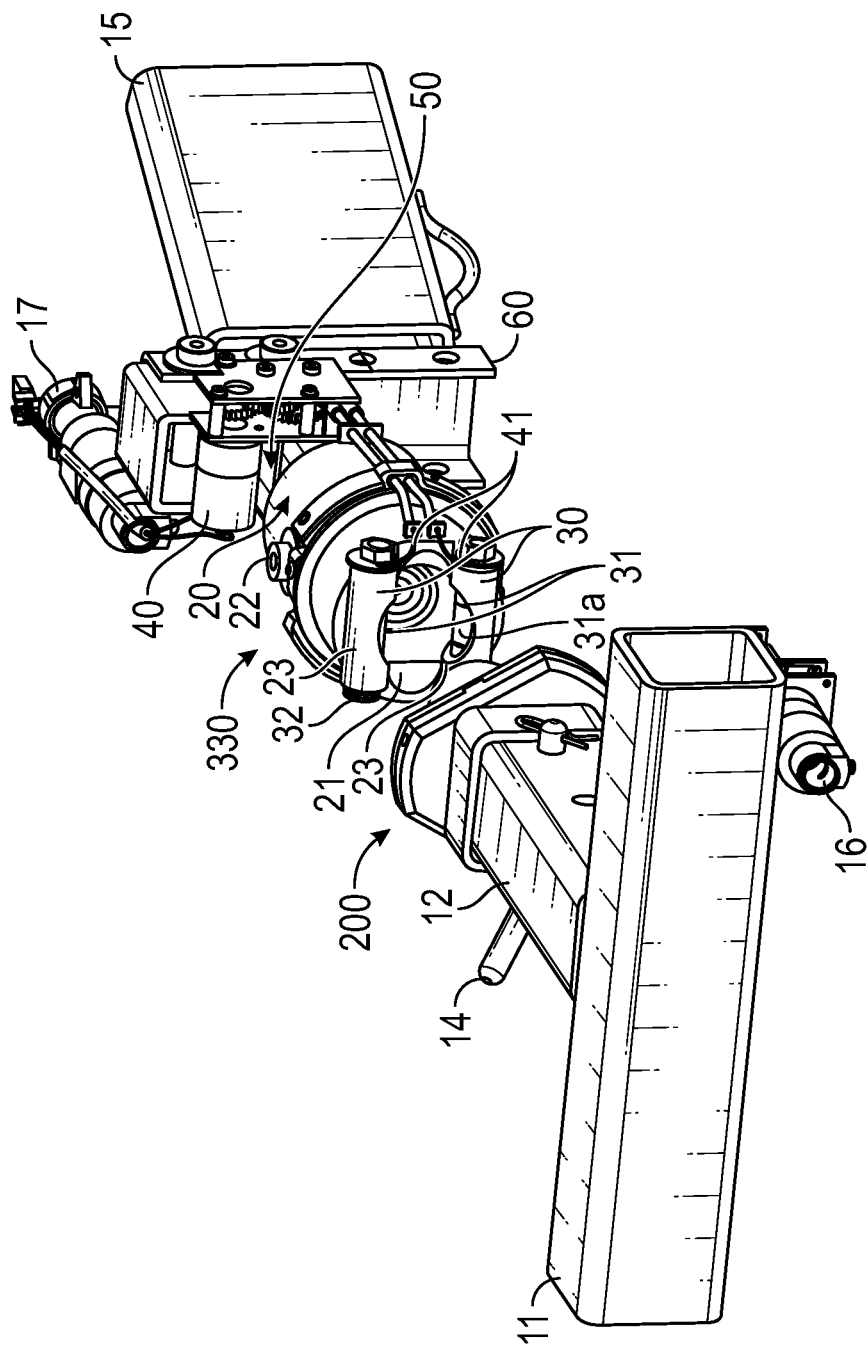
FIG. 7 provides an example of a trailer coupler assembly with which a trailer electrical connector assembly may be used in accordance with one or more embodiments of the present invention.

FIG. 7 is similar to FIG. 1B except that sleeve ring 310 and sleeve 320 are removed to reveal the trailer coupler assembly described in the '862 Application. Main body 20 includes a frontward-facing opening 21 that is configured to receive hitch ball 13. Main body 20 may be configured to couple to shaft 50 via a pivoting connection 22 (e.g., via a vertically oriented bolt).

Frontward-facing opening 21 may have a generally circular shape and may form a generally round interior surface which may correspond to the shape and size of hitch ball 13. Housings 23 may be positioned towards the top and bottom of the front of main body 20. Housings 23 may be in the form of cylinders having a hollow interior for receiving portions of locking assembly 30. Each housing 23 may include a cutout that corresponds with frontward-facing opening 21. For example, each cutout may have a semicircular shape that generally aligns with the portion of frontward-facing opening 21 over which it is positioned. The cutout may extend into the hollow interior of housing 23 to thereby form an opening. In other embodiments, main body 20 may include only a single housing 23 (e.g., only a top housing 23, only a bottom housing 23, etc.).

Main body 20 may include opposing beveled edges at opposing sides of frontward-facing opening 21. Each beveled edge may have an arcuate shape and may enable an increased articulation angle of a trailer when coupled to a vehicle via the trailer coupler assembly. Main body 20 may also form a hollow rear interior. Shaft 50 may extend into the hollow rear interior and may be secured to main body 20 via a bolt or other connection member to form a pivoting connection 22. Shaft 50 may be smaller than the hollow rear interior so that main body 20 may pivot relative to shaft 50. A bumper may be positioned inside the hollow rear interior and may at least partially surround shaft 50. The bumper may be sandwiched between shaft 50 and the wall of the hollow rear interior to thereby limit the pivoting of main body 20 relative to shaft 50. However, the bumper may be formed of rubber or another compressible material to thereby allow controlled pivoting of main body 20.

Locking assembly 30 includes opposing securing pins 31 that are configured to be positioned in housings 23. For example, securing pins 31 can have a cylindrical shape that matches the shape of the hollow interior of housings 23 to thereby allow securing pins 31 to be rotated within the hollow interior. The length of securing pins 31 can exceed the length of housing 23 such that each end of securing pins 31 extends out from housing 23.

Frontward-facing opening 21 is sufficiently large to receive hitch ball 13 (i.e., its diameter is greater than the diameter of hitch ball 13). However, with securing pins 31 inserted into housings 23, securing pins 31 extend into the cutouts overtop frontward-facing opening 21. The spacing between housings 23 can be configured to ensure that the distance between the outer surface/diameter of securing pins 31 is less than the diameter of hitch ball 13 (i.e., hitch ball 13 will be prevented from passing between securing pins 31). In embodiments that include a single housing 23 and securing pin 31, the distance between securing pin 31 and the opposing side of frontward-facing opening 21 can be less than the diameter of hitch ball 13.

To enable hitch ball 13 to pass between securing pins 31 (or past securing pin 31 in embodiments with a single securing pin 31), a notch 31a may be formed in the outer surface of securing pins 31. Securing pins 31 can be oriented within housings 23 so that notches 31a are generally oriented towards one another. A spring 32 or other biasing member may be used to bias securing pins 31 into the orientation shown in FIG. 7. In this orientation, notches 31a face slightly frontward. Securing pins 31 can be rotated against the biasing force to cause notches 31a to face one another (e.g., upwardly and downwardly respectively). Securing pins 31 could be rotated into this orientation when hitch ball 13 is forced against notches 31a. The dimensions of notches 31a can be configured to allow hitch ball 13 to pass between securing pins 31 when notches 31a face one another. Accordingly, the rotation of securing pins 31 allows hitch ball 13 to be inserted into frontward-facing opening 21. In embodiments with a single securing pin 31, the distance between notch 31a and the opposing side of frontward-facing opening 21 that notch 31a faces once rotated can be greater than the diameter of hitch ball 13 to thereby allow hitch ball 13 to pass through.

Once hitch ball 13 has passed into frontward-facing opening 21 (e.g., as the vehicle is backed towards the trailer), the biasing force of springs 32 can rotate securing pins 31 back into the orientation shown in FIG. 7 thereby retaining hitch ball 13 within frontward-facing opening 21. Notably, in their frontward-facing orientations, notches 31a will be oriented away from hitch ball 13 when hitch ball 13 is positioned within frontward-facing opening 21. Therefore, as hitch ball 13 is pulled forwardly against securing pins 31, such as during towing, the frontward force of hitch ball 13 will be applied tangentially to the rounded portion of securing pins 31 as opposed to notches 31a which, in combination with the biasing force from springs 32, will tend to retain securing pins 31 in their frontward-facing orientation.

Release assembly 40 can be configured to rotate securing pins 31 to allow hitch ball 13 to pass through frontward-facing opening 21. Release assembly 40 may include a motor that drives gears for rotating pulleys. One end of wires 41 can be coupled to the pulleys while the other end of wires 41 can be coupled to and routed around securing pins 31.

When the motor is driven, the pulleys can apply a pulling force on the wires. Due to the routing of the wires around securing pins 31, this pulling force can cause securing pins 31 to be rotated against the biasing force of springs 32 to cause notches 31a to face one another. Accordingly, to decouple hitch ball 13 from main body 20, the motor can be driven. Once the motor is no longer driven, springs 32 can bias securing pins 31 back into their frontward facing orientations. The motor could be powered in any suitable manner such as via a power source on the trailer, from the vehicle including via connector assembly 100, via a battery, etc. The motor can also be controlled in any suitable manner. For example, the motor could be integrated with a wireless receiver that enables a user to drive the motor via a key fob, a mobile application, or other transmitter. In some embodiments, the motor could be coupled to a control system of an electric vehicle (e.g., via connector assembly 100) and could therefore be controlled directly from the vehicle.

In some embodiments, a lift mechanism could be provided to enable the height of main body 20 relative to the ground to be adjusted. For example, a remote-controlled lift mechanism could be mounted to the trailer and could be used to position main body 20 and therefore trailer portion 300 at the appropriate height relative to hitch ball 13 and vehicle portion 200. Such a lift mechanism could facilitate this alignment while a driver backs a vehicle towards the trailer (e.g., while using a rear camera). In some embodiments, one or more sensors (e.g., infrared, Bluetooth, RFID, vision, etc.) could be integrated into main body 20, hitch ball 13, and/or a nearby component to detect the height of an approaching hitch ball 13 relative to frontward-facing opening 21 and could be used to automatically drive a lift mechanism to align frontward-facing opening 21 to hitch ball 13. In such embodiments, such sensors could be used to authenticate a vehicle and/or a trailer before enabling securing pin(s) 31 to be rotated to thereby enable coupling to or decoupling from the trailer. For example, a trailer coupler assembly configured in accordance with embodiments of the present invention could include circuitry that prevents securing pin(s) 31 from rotating until a particular code or sequence is received/detected from the vehicle and/or a user of the vehicle. All such electrical components could be powered and/or controlled via connector assembly 100.

As can be seen, a trailer electrical connector assembly configured in accordance with embodiments of the present invention can facilitate the automatic coupling and decoupling of a trailer. For example, a user need only back a vehicle to insert hitch ball 13 through sleeve ring 310 and into frontward-facing opening 21 to connect a trailer to the vehicle and to establish an electrical connection.

A trailer electrical connector assembly configured in accordance with embodiments of the present invention also enables autonomous coupling and decoupling of a trailer. For example, an autonomous vehicle can employ its camera(s) and/or sensor(s) to back up to insert hitch ball 13 through sleeve ring 310 and into frontward-facing opening 21 to couple to a trailer and establish an electrical connection and may use its control system or other transmitter to drive the motor of release assembly 40 to decouple from the trailer. In such embodiments, a remotely controlled lift mechanism could be included on the trailer to facilitate this autonomous coupling and decoupling.

In some embodiments, guides 210 could be formed on sleeve ring 310 while receivers 311 and sleeve guides 312 could be formed on hitch ring 220 (i.e., the locations of these components could be swapped). Accordingly, embodiments of the present invention encompass implementations where guides 210 are part of trailer portion 300 while receivers 311 are part of vehicle portion 200. Embodiments of the present invention also encompass implementations where other structures are employed on vehicle portion 200 and/or trailer portion 300 to establish an electrical connection when a hitch ball is inserted into sleeve 320.

The electrical connection established via a trailer electrical connector assembly configured in accordance with embodiments of the present invention can be used to provide power to a trailer and/or to communicate data, control signals, etc. to/from components on the trailer. For example, in some embodiments, the electrical connection may only provide power in a similar manner as traditional trailer electrical connections such as via the typical wiring of a 4-way or 7-way connection. As another example, the electrical connection may be used to establish one or more data connections/buses (e.g., a USB connection) between control circuity (e.g., one or more processors) on the trailer and a vehicle's control system such as to obtain a video feed from a camera on the trailer, adjust a lift mechanism or other component on the trailer, etc. In some embodiments, the electrical connection may enable an electric vehicle to be charged from a battery on a trailer (e.g., while pulling the trailer) or to implement a vehicle-to-grid system (e.g., to provide power to a home).

In some embodiments, a trailer electrical connector assembly configured in accordance with embodiments of the present invention could be used to automatically detect when a trailer detaches from a vehicle and to automatically trigger the trailer's emergency brakes. For example, circuitry included in or integrated with trailer portion 300 could be configured to sense when the electrical connection between vehicle portion 200 and trailer portion 300 has been disconnected and could activate the trailer's brakes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A trailer electrical connector assembly comprising:
   a vehicle portion having a hitch ring in which a first set of connectors are positioned, the hitch ring being configured to be secured around a shaft of a rearwardly oriented hitch ball of a vehicle such that an entirety of the rearwardly oriented hitch ball extends beyond the hitch ring to thereby position the hitch ring frontward of the rearwardly oriented hitch ball; and
   a trailer portion having a sleeve and a sleeve ring in which a second set of connectors are positioned, the sleeve being configured to extend frontward overtop a frontward-facing opening of a trailer that receives the rearwardly oriented hitch ball to couple the vehicle to the trailer, the sleeve ring being coupled to a front of the sleeve, wherein the sleeve ring is configured to receive the rearwardly oriented hitch ball to thereby enable the rearwardly oriented hitch ball to insert into the frontward-facing opening, wherein the sleeve ring is configured to couple with the hitch ring to form an electrical connection between the first set of connectors and the second set of connectors when the rearwardly oriented hitch ball is inserted through the sleeve ring.

2. The trailer electrical connector assembly of claim 1, wherein the hitch ring includes guides and the first set of connectors are positioned in the guides.

3. The trailer electrical connector assembly of claim 2, wherein each guide comprises a recessed surface in which at least one connector of the first set of connectors is positioned.

4. The trailer electrical connector assembly of claim 3, wherein the recessed surface is formed between inner walls of the guide.

5. The trailer electrical connector assembly of claim 4, wherein the sleeve ring includes receivers in which the second set of connectors are positioned, each receiver inserting between the inner walls of a respective guide.

6. The trailer electrical connector assembly of claim 5, wherein the sleeve ring includes sleeve guides that interface with outer walls of the guides to align the receivers with the guides.

7. The trailer electrical connector assembly of claim 2, wherein the hitch ring and the sleeve ring include magnets for coupling the sleeve ring with the hitch ring.

8. The trailer electrical connector assembly of claim 2, wherein the vehicle portion includes a cover that is secured to the hitch ring.

9. The trailer electrical connector assembly of claim 2, wherein the guides are spaced around an opening through which the shaft of the rearwardly oriented hitch ball extends.

10. The trailer electrical connector assembly of claim 1, wherein the sleeve includes a number of folds to enable the sleeve to bend.

11. The trailer electrical connector assembly of claim 1, wherein the sleeve is flexible.

12. The trailer electrical connector assembly of claim 1, wherein the sleeve forms wire openings through which wires enter an interior of the sleeve.

13. The trailer electrical connector assembly of claim 1, wherein the trailer portion includes a clamping assembly by which the sleeve is secured to a trailer.

14. A trailer electrical connector assembly comprising:
a vehicle portion comprising a hitch ring that is configured to be secured around a shaft of a hitch ball such that an entirety of the hitch ball extends beyond the hitch ring, the vehicle portion also including guides that extend from the hitch ring, each guide housing at least one connector; and
a trailer portion comprising a sleeve and a sleeve ring, the sleeve having a first end that is configured to be secured to a trailer around a trailer coupler mechanism and a second end to which the sleeve ring is attached, the sleeve ring including receivers, each receiver housing at least one connector, wherein the receivers couple with the guides to form an electrical connection via the respective connectors when the hitch ball is inserted through the sleeve ring and into the sleeve.

15. The trailer electrical connector assembly of claim 14, wherein the receivers couple with the guides by inserting into the guides.

16. The trailer electrical connector assembly of claim 14, wherein the hitch ring is configured to be secured around a shaft of a rearwardly oriented hitch ball such that the entirety of the rearwardly oriented hitch ball extends rearwardly beyond the hitch ring.

17. The trailer electrical connector assembly of claim 14, wherein the vehicle portion and the trailer portion include magnets by which the receivers remain coupled with the guides.

18. A trailer coupler assembly comprising:
a main body forming a frontward-facing opening for receiving a rearwardly oriented hitch ball;
a vehicle portion configured to be secured around a shaft of the rearwardly oriented hitch ball such that the vehicle portion is positioned frontward of the rearwardly oriented hitch ball with an entirety of the rearwardly oriented hitch ball extending beyond the vehicle portion, the vehicle portion including guides; and
a trailer portion having a sleeve that extends frontwardly over the frontward-facing opening and a sleeve ring positioned at a front of the sleeve, the sleeve ring including receivers that couple with the guides to form an electrical connection when the rearwardly oriented hitch ball inserts through the sleeve ring and into the sleeve.

19. The trailer coupler assembly of claim 18, wherein the vehicle portion and the trailer portion include magnets for causing the receivers to remain coupled with the guides.

20. The trailer coupler assembly of claim 18, wherein the receivers insert into the guides to form the electrical connection.

\* \* \* \* \*